United States Patent [19]

Beard et al.

[11] Patent Number: 4,919,312
[45] Date of Patent: Apr. 24, 1990

[54] COLLAPSIBLE CHAMBER METERING VALVES

[75] Inventors: Walter C. Beard, Middlebury, Conn.; Michael D. Yallop, Norfolk, Great Britain

[73] Assignee: Bespak PLC, Norfolk, United Kingdom

[21] Appl. No.: 112,604

[22] PCT Filed: Jan. 29, 1987

[86] PCT No.: PCT/GB87/00062
§ 371 Date: Nov. 19, 1987
§ 102(e) Date: Nov. 19, 1987

[87] PCT Pub. No.: WO87/04685
PCT Pub. Date: Aug. 13, 1987

[51] Int. Cl.$^5$ .................... B65D 83/14; G01F 11/00
[52] U.S. Cl. ............................ 222/402.2; 222/213; 222/107
[58] Field of Search .................. 222/402.1, 402.2, 633, 222/635, 213

[56] References Cited

U.S. PATENT DOCUMENTS

| | | | |
|---|---|---|---|
| 3,104,785 | 9/1963 | Beard | 222/402.2 X |
| 3,377,004 | 4/1968 | Kjelson | 222/402.2 |
| 3,415,425 | 12/1968 | Knight et al. | 222/402.2 X |
| 3,858,771 | 1/1975 | Bret et al. | 222/402.2 |
| 4,088,248 | 5/1978 | Blake | 222/213 X |
| 4,526,297 | 7/1985 | Grimsley | 222/107 |
| 4,548,338 | 10/1985 | Sander | 222/107 |

Primary Examiner—F. J. Bartuska
Assistant Examiner—Glenn L. Heinl
Attorney, Agent, or Firm—Beveridge, DeGrandi & Weilacher

[57] ABSTRACT

Dispensing apparatus (10) for use in a pressurized dispensing container (12) comprises a valve (18) mounted in a cup member (11) and an elastomeric vessel (13) forming a collapsible chamber (23). The vessel (13) is attached to the mounting and depends from the cup cylindrically surrounding the valve body (18). The vessel is attached to the cup member by having a flange (14) which is thermally bonded to the thermoplastic layer (5) covering the internal surface of the cup member. The flange (14) includes grooves (9) which prevent contamination from sputtering during thermal bonding. The apparatus has application for medical products including edible foam dispensed from containers having an internal fill pressure.

6 Claims, 3 Drawing Sheets

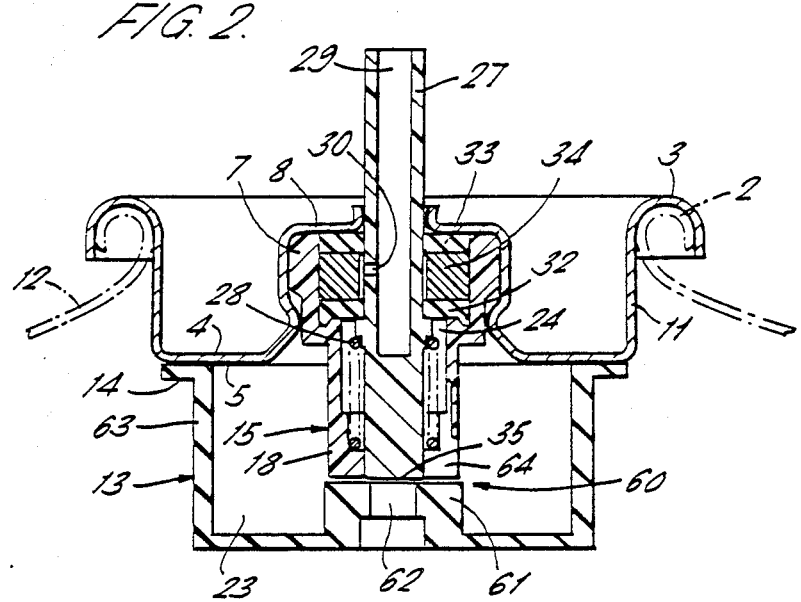
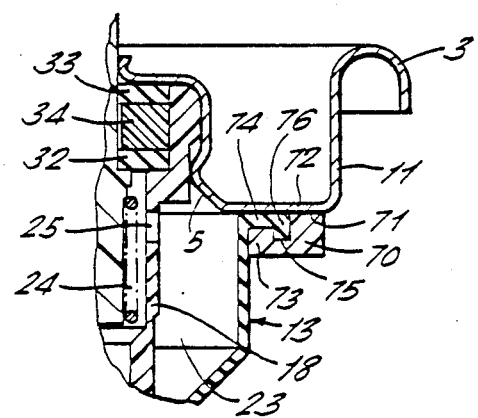

4,919,312

COLLAPSIBLE CHAMBER METERING VALVES

FIELD OF THE INVENTION

This invention relates to collapsible chamber metering valves and to dispensing apparatus including such valves for use in pressurized dispensing containers.

PRIOR ART

It is known to provide dispensing apparatus for a pressurized dispensing container comprising a mounting cup peripherally secured to the container, a valve mounted in the cup member such that a valve stem of the valve extends through an aperture defined by the cup member and wherein the valve includes a collapsible chamber comprising an elastomeric vessel for metering a pre-determined volume of fluid to be dispensed, inlet valve means admitting pressurized fluid to the chamber from the container when the valve is in a closed condition and outlet valve means releasing fluid from the chamber through the valve stem when the valve is in an open condition to thereby dispense the pre-determined volume of fluid.

U.S. Pat. No. 3,104,785 discloses such an arrangement in which the elastomeric vessel is of generally tubular shape so as to surround the lower part of the valve. The vessel is secured in place by virtue of the valve cup being crimped around the container opening so as to grip a radially extending flange of the elastomeric vessel. An alternative arrangement is shown in DE 2043415 in which the elastomeric vessel is gripped by crimping the valve cup against the valve body with a tubular portion of the elastomeric vessel trapped therebetween.

A need exists for providing a simplified dispensing apparatus which can be more readily and simply fabricated and which provides high reliability. There is also a need to provide apparatus which will perform well under conditions of high internal fill pressure of the pressurized dispensing container.

SUMMARY OF THE INVENTION

According to the present invention there is disclosed a dispensing apparatus for use in a pressurized dispensing container and comprising a mounting cup member peripherally securable to the container, a valve mounted in the cup member such that at least a valve stem of the valve extends through an aperture defined by the cup member, which valve includes collapsible chamber means comprising an elastomeric vessel for metering a predetermined volume of fluid to be dispensed, inlet valve means admitting pressurized fluid to the chamber from the container when the valve is in a closed condition and outlet valve means releasing fluid from the chamber through the valve stem when the valve is in an open condition to thereby dispense the predetermined volume of fluid, characterized in that the mounting cup member includes a thermoplastic layer attached to its interior surface with respect to the container and the collapsible chamber means includes an annular bonding portion of a plastics material which is thermally bonded to the thermoplastic layer.

An advantage of such apparatus is that the assembly is simplified and readily incorporated in an automated production line. The thermal bond also provides a reliable and secure means of attaching the elastomeric vessel.

Preferably the annular bonding portion of the collapsible chamber means comprises an integrally formed flange of the elastomeric vessel.

Such a flange is then directly thermally bonded to the thermoplastic layer of the cup member.

Alternatively the annular bonding portion of the collapsible chamber means comprises a retaining ring having means for gripping an integrally formed flange of the elastomeric vessel in sealing contact with the mounting cup member.

The annular bonding portion may in either case comprise at least one annular groove in the bonding surface presented to the thermoplastic layer. An advantage of such grooves is that the release of globules of plastics materials during the thermal bonding process is inhibited by the presence of the grooves. In the absence of such grooves it has been found that contamination internally or externally with respect to the elastomeric vessel may occur from plastics material sputtered during the thermal bonding and by the use of grooves distributed suitably across the bonding surface the effects of sputtering can be substantially eliminated. It is particularly important to eliminate contamination when the apparatus is to be used for dispensing medicinal products.

In a preferred embodiment of the invention the elastomeric vessel includes an annular lip region defining a duct communicating with the interior of the container in a closed condition of the valve, which duct is in axial alignment with the valve stem and the valve stem cooperates with the lip region to provide the inlet valve means such that upon axial depression of the valve stem the duct is closed by an end portion of the valve stem.

An advantage of such apparatus is that the valve construction is simplified and moreover the elastomeric vessel is axially elongated by depression of the valve stem which urges the vessel into the collapsed condition thereby assisting the dispensing of the pre-determined volume of fluid.

Advantageously the valve stem comprises a radially extending aperture communicating with an axially extending outlet channel and the valve further comprises a valve seal assembly sealingly located circumferentially about the valve stem adjacent the cup member and relative to which the valve stem is axially slidable, which valve seal assembly includes a pair of axially spaced resilient valve gaskets and a relatively rigid arrestor sleeve therebetween, the arrangement being such that in a closed condition of the valve the radially extending aperture terminates radially adjacent the arrestor sleeve.

An advantage of such an arrangement is that the leakage of fluid from the radially extending aperture is prevented whilst the valve is in the closed position. This overcomes the problem of drain back which has been found to occur in prior art structures in which the aperture is normally located above the cup member. Such drain back is due to the leakage through the aperture of fluid retained within the valve stem following use. Such drain back has been known to result in an accumulation of fluid upon the outer surface of the cup member surrounding the valve stem.

Preferably the arrestor sleeve is received as a snap fit within a throat portion of the valve.

Conveniently the thermoplastic layer covers the entire interior surface of the mounting cup member. Alternatively a localized annular layer portion could be applied to the mounting cup member.

Particular embodiments of the invention will now be described by way of example only and with reference to the accompanying drawings.

DESCRIPTION OF DRAWINGS

In the drawings:

FIG. 2 is a similar view of an alternative dispensing apparatus in which the valve stem co-operates with a lip region of the elastomeric vessel to provide the inlet valve means of the valve, and FIG. 3 is a similar view of a further alternative dispensing apparatus in which a retaining ring is bonded to the thermoplastic layer of the cup member, which retaining ring grips a flange of the elastomeric vessel.

DESCRIPTION OF PREFERRED EMBODIMENTS

Figure 1:
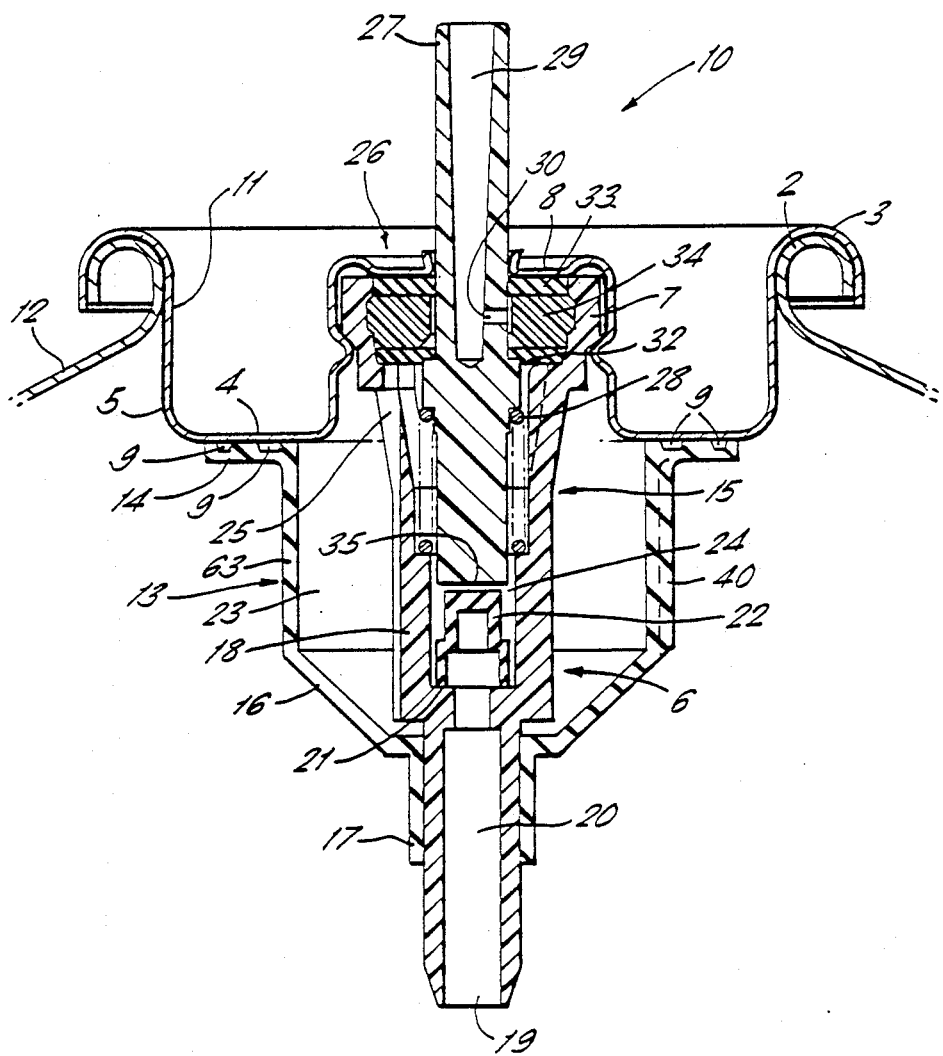
FIG. 1 is a sectional view of dispensing apparatus in accordance with the present invention.

A dispensing apparatus 10 is shown in FIG. 1 which incorporates a valve mounting cup 11 which is shown in a seated position on the mouth 2 of an aerosol type pressurized dispensing container 12. The perimeter regions 3 of the cup 11 are connected to the lip region of the mouth 2 of the container 12 by crimping in the conventional manner well known to the aerosol container field.

The container 12 is charged with a fill (not shown) and with a pressurized gaseous propellant such as "Freon" gas, nitrogen, or the like. The apparatus 10 is particularly well adapted for use on containers which are pressurized to values in the range of from about 60 to 90 PSIG (515,000 to 722,000 Pascals absolute pressure) which is substantially higher than the typically low pressures of 20 to 35 PSIG (239,000 to 343,000 Pascals absolute pressure) associated with typical aerosol containers. Also, the apparatus 10 is particularly well adapted for the metered dispensing of edible foam pharmaceuticals.

The apparatus 10 incorporates a generally cylindrical vessel 13 which is formed of an injection moulded plastics material which is characteristically non-rigid and elastomeric in behaviour. The vessel 13 is provided with an upper peripheral flange 14 adapted to abut against a flat bottom region 4 of the valve mounting cup 11. Two annular grooves 9 are provided in the upper surface of the flange 14. A number of axially extending stiffening ribs 40 are provided in the cylindrical sidewall 63 of the vessel 13. Interposed between cup 11 and flange 14 is a layer 5 of thermoplastic material which is adapted to heat seal both to the flange 14 and to the mounting cup 11 upon the application of heat in a localized manner during assembly of the vessel 13 with the cup 11. The cup is formed of stamped, formed sheet metal.

Figure 4:
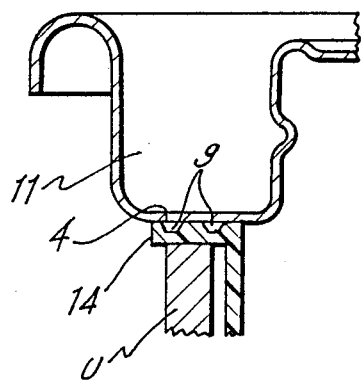
FIG. 4 is a view of the ultrasonic bonding step.

In the example shown, the cup 11 is provided with a layer 5 comprising a laminated film of polypropylene secured on its entire interior surface portions. This film is therefore also available to aid in forming a seal between the perimeter portions 3 of the cup 11 and the mouth 2 of the container 12. The thermoplastic material of the vessel 13 is a suitable olefine based material selected for its compatibility with the polypropylene of the laminated film in respect of heat bonding. The flange 14 is bonded to the layer 5 by means of a conventional ultrasonic welding technique. As shown in FIG. 4, an ultrasonic head is presented to the underside of the flange whilst the flange is in contact with the layer 5. Ultrasonically generated heat is then applied for a sufficient period to effect a satisfactory bond. The grooves 9 function to alleviate the problem of sputtering of plastics material during thermal bonding and any globules of excess material tend to be contained within the grooves rather than contaminating the interior or exterior of the vessel 13.

The lower regions of the vessel 13 are conically tapered to form a neck region 16 which is integrally joined with a cylindrically formed head region 17. Sited in the neck region 17 is a valve body 18 of a valve 15 formed of a moulded rigid plastics material. The innermost end of the valve body 18 terminates in a mouth 19 which is associated with an axially disposed channel 20 which leads to a valve seat 21 formed internally at one end of a valve chamber 24. An inverted generally cup shaped valve plug 22 is located within the valve chamber 24 and seats over the valve seat 21 in the position shown in FIG. 1. The valve plug 22 co-operates with the valve seat 21 to provide an inlet valve means 6 which functions as a one way valve allowing fluid to enter the valve chamber 24 from the interior of the container 12 via the channel 20. An annular collapsible chamber 23 is defined by the elastomeric vessel 13 and the valve body 18 and a plurality of apertures 25 communicate between the collapsible chamber 23 and the valve chamber 24. The apertures 25 being defined in upper sidewall portions of the valve body 18.

The upper end of the valve body 18 has an enlarged throat portion 7 adapted to receive in seating engagement a valve seal assembly 26. The upper end portion of the valve body 18 is secured by crimping within a centrally formed region 8 of the mounting cup 11. Since the inside surface of the cup 11 is provided with a thermoplastic film layer, it is convenient to sealingly engage the outside wall portions of the valve body to the thermoplastic film to complete the mounting and assembly of the apertures 10. Axially positioned in the valve body 18 and extending from the region of the chamber 21 through the valve seal assembly 26 and projecting externally some predetermined distance is a valve stem 27. Circumferentially positioned about the valve stem 27 in the region of the valve chamber 24 is a compression spring 28 which spring 28 serves to bias the valve stem 27 in a normally closed condition of the valve 15 as illustrated in FIG. 1. The upper portion of the valve stem 27 is hollow and has defined therein an axially extending outlet channel 29. In communication with the outlet channel 29 and normally situated in the region of the valve seal assembly 26 a radially extending orifice 30 is provided in the stem 27. The valve stem 27 terminates in a bottom face 35 within the valve chamber 24 at a position adjacent to but spaced from the valve plug 22 when the valve 15 is in a closed condition as shown in FIG. 1.

A dispensing nozzle (not shown) is fitted over the exterior upper end of the valve stem 27.

The valve seal assembly 26 is comprised of three elements, a primary valve gasket 32 comprised of a relatively soft elastomeric material, a secondary gasket 33 similarly comprised of a relatively soft elastomeric material, and an intermediate "arrestor" or spaced sleeve 34 comprised of a relatively hard, relatively non-yielding resin. The primary valve gasket 32 effects sealing action between the stem 27 and the throat portion 7 at the upper end of the valve chamber 24 and co-operates with the stem, the orifice 30 and channel 29 to provide outlet valve means of the valve 15. The secondary valve gasket 33 is located between the arrestor sleeve 34 and the cup member 11. The arrestor sleeve 34 is profiled to be a snap fit within the throat portion 7 to facilitate assembly. The valve orifice 30 is so positioned along the channel 29 as to lie axially intermediately between the upper and lower faces of the arrestor 34 or approximate midway between the primary and secondary gaskets 32 and 33, respectively, when the valve 15 is in the closed condition or non-dispensing configuration illustrated in FIG. 1.

In use, the dispensing nozzle is vertically depressed as by a thumb of an operator or the like. This pressure axially moves the entire valve stem 27 downwardly against the bias of the spring 28 so that the bottom face 35 of the valve stem 27 engages the upper face of the valve plug 22 thereby sealing the plug 22 against the valve seat 21. This action effectively blocks any flow into the valve chamber 34 via the channel 20 from the container 12. Continued downward movement of the valve stem 27 is accommodated by axial compression of the valve plug 22 which is formed of elastomeric material. Once the downward movement of the valve stem 27 causes the orifice 30 to pass below the primary valve gasket 32, the pressurised fill of fluid in the collapsible chamber 23 and in the chamber 24 can egress through the outlet channel 29 of the valve stem 27 and out through the dispensing nozzle. The valve 15 is then in its open condition in which the inlet valve means 6 is closed and the outlet valve means is open. The dispensing action continues until substantially the entire contents of the collapsible chamber 23 have been discharged, discharge being effected by the collapse of the vessel 13 under pressure exerted within the pressurized container 12.

At the close of the dispensing operation, thumb pressure is released from the dispensing nozzle and the valve stem 27 is allowed to rise by return action of the spring 28 so as to elevate the orifice 30 beyond the primary gasket 32. The pressure upon the valve plug 22 exerted by the stem 27 is relieved thereby placing the valve 15 in its normal closed condition and allowing a flow of fluid through the inlet valve means to recharge the collapsible chamber 23 with fluid in readiness for a further dispensing operation.

The valve seal assembly 26 functions to prevent residual drainage sometimes called "drain back" from the residual contents retained within the outlet channel 29 of the valve stem 27 since the orifice 30 communicates only with a closed annular cavity bounded radially by the stem 27 and the arrestor sleeve 34 and axially by the primary and secondary gaskets 32 and 33 respectively.

An alternative embodiment of the invention is shown in FIG. 2 in which reference numerals corresponding to those of FIG. 1 are used where appropriate for corresponding components. A valve 15 is supported in a valve cup 11 with an elastomeric vessel 13 heat bonded to a thermoplastic layer 5 attached to the cup such that the vessel defines a collapsible chamber 23 depending from the cup and enclosing a valve body 18. A valve stem 27 extends through a valve chamber 24 of the valve 15 and has a bottom face 35 which in the closed condition of the valve is adjacent to but spaced from an annular lip region 61 of the vessel 13. The lip region 61 defines a duct 62 extending coaxially with the stem and communicating between the collapsible chamber 23 and the interior of the container 12. The valve body 18 is provided with apertures 64 at its lower extremity communicating between the collapsible chamber 23 and the valve chamber 24. The valve 15 in the FIG. 2 embodiment thereby includes an alternative inlet valve means 60 in which the bottom face 35 of the valve stem 27 co-operates with the annular lip region 61 of the elastomeric vessel 13 to provide valve action to open or close the duct 62. When the valve 15 is in its normally closed condition the bottom face 35 of the valve stem 27 is adjacent to but spaced from the lip region 61 such that fluid may flow from the container 12 through the duct 62 and into the collapsible chamber 23. When the valve stem 27 is depressed such that the valve 15 is moved into its open condition, the bottom face 35 of the valve stem 27 engages the lip region 61 so as to close the duct 62. Continued depression of the valve stem 27 results in a deformation of the vessel 13 so as to extend axially thereby urging the sidewalls 63 of the vessel 13 radially inward and by this action the collapse of the chamber 23 is positively assisted.

Dispensing occurs by the flow of fluid displaced from the collapsing vessel 13 passing through the apertures 64 into the valve chamber 24, through the orifice 30 and into the outlet channel 29.

A further alternative embodiment of the present invention is shown in FIG. 3 in which reference numerals in common with FIGS. 1 and 2 are used where appropriate. The elastomeric vessel 13 is attached to the cup member 11 by means of a retaining ring 70, the upper surface 71 of which includes a radially outermost annular portion 72 which is thermally bonded to the thermoplastic layer 5 of the cup member 11. The ring 70 has a radially innermost part 73 which is recessed to receive an out-turned flange 74 of the vessel 13, the innermost part 73 further including a groove 75 to accommodate a downturned end portion 76 of the flange 74.

This arrangement is particularly useful where the layer 5 and the vessel 13 are formed for dissimilar materials which are not compatible for thermal bonding with one another so that the vessel 13 is retained frictionally by the retaining ring 17 which has a material selected for bonding compatability with the layer 5.

Alternative embodiments of the present invention are possible in which for example the thermoplastic layer applied to the inner surface of the cup member is a localised layer in the form of a ring of plastics material which is adhered to the cup flat bottom portion of the cup member preferably after the member has been pressed into shape.

Alternative materials for the elastomeric vessel may be used such as a polyester based material which has the advantage of being more easily and accurately moulded. A compatible material would then need to be selected for the thermoplastic layer if such a vessel were to be directly bonded to the layer. Alternatively where the layer was not of a compatible material a retaining ring could be bonded to the layer as described above.

Apparatus as shown in FIGS. 2 and 3 may be modified to include grooves corresponding to the annular grooves 9 of FIG. 1 in order to eliminate the effects of sputtering.

Alternate methods to ultrasonic welding may be employed in the application of heat to form a thermal bond such as infra-red heating.

We claim:

1. Dispensing apparatus (10) for use in a pressurized dispensing container and comprising a mounting cup member peripherally securable to the container, a valve mounted in the cup member such that at least a valve stem of the valve extends through an aperture defined by the cup member, which valve includes collapsible chamber means comprising an elastomeric vessel for metering a predetermined volume of fluid to be dispensed, inlet valve means admitting pressurized fluid to the chamber from the container when the valve is in a closed condition and outlet valve means releasing fluid from the chamber through the valve stem when the valve is in an open condition to thereby dispense the predetermined volume of fluid, wherein the mounting cup member includes a thermoplastic layer attached to its interior surface with respect to the container, the collapsible chamber means includes an annular bonding portion of a plastics material which is thermally bonded to the thermoplastic layer, and wherein the annular bonding portion of the collapsible chamber means comprises a retaining ring having means for gripping an integrally formed flange of the elastomeric vessel in sealing contact with the mounting cup.

2. Dispensing apparatus as claimed in claim 1 wherein the annular bonding portion comprises at least one annular groove (9) in the bonding surface presented to the thermoplastic layer.

3. Dispensing apparatus as claimed in claim 1 characterized in that the elastomeric vessel includes an annular lip region (61) defining a duct (62) communicating with the interior of the container in a closed condition of the valve, which duct is in axial alignment with the valve stem and that the valve stem co-operates with the lip region to provide the inlet valve means such that upon axial depression of the valve stem the duct is closed by an end portion (35) of the valve stem.

4. Dispensing apparatus as claimed in claim 1 characterized in that the valve stem comprises a radially extending aperture (30) communicating with an axially extending outlet channel (29) and the valve further comprises a valve seal assembly (26) sealingly located circumferentially about the valve stem adjacent the cup member and relative to which the valve stem is axially slidable, which valve seal assembly includes a pair of axially spaced resilient valve gaskets (32, 33) and a relatively rigid arrestor sleeve (34) therebetween, the arrangement being such that in a closed condition of the valve the radially extending aperture terminates radially adjacent the arrestor sleeve.

5. Dispensing apparatus as claimed in claim 4 characterized in that the arrestor sleeve is received as a snap fit within a throat portion (7) of the valve.

6. Dispensing apparatus as claimed in claim 1 characterized in that the thermoplastic layer covers the entire interior surface of the mounting cup member.

* * * * *